(12) United States Patent
Takahashi et al.

(10) Patent No.: US 8,596,644 B2
(45) Date of Patent: Dec. 3, 2013

(54) SEAL STRUCTURE FOR ENGINE

(75) Inventors: Hideaki Takahashi, Okazaki (JP); Yoichi Oyamada, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 361 days.

(21) Appl. No.: 13/008,434

(22) Filed: Jan. 18, 2011

(65) Prior Publication Data

US 2011/0204581 A1 Aug. 25, 2011

(30) Foreign Application Priority Data

Feb. 19, 2010 (JP) ................................. 2010-035155

(51) Int. Cl.
*F02F 11/00* (2006.01)
(52) U.S. Cl.
USPC .......................................... 277/598; 277/591
(58) Field of Classification Search
USPC .................................. 277/591, 598
See application file for complete search history.

(56) References Cited

U.S. PATENT DOCUMENTS

| | | | | |
|---|---|---|---|---|
| 4,832,349 A | * | 5/1989 | Kawai et al. | 277/591 |
| 5,727,791 A | * | 3/1998 | Weiss et al. | 277/592 |
| 6,659,471 B2 | * | 12/2003 | Mori et al. | 277/592 |
| 7,677,578 B2 | | 3/2010 | Taguchi | |
| 2005/0285351 A1 | * | 12/2005 | Taguchi et al. | 277/591 |
| 2006/0202432 A1 | | 9/2006 | Taguchi | |
| 2009/0266332 A1 | | 10/2009 | Kawamoto | |
| 2011/0049814 A1 | * | 3/2011 | Iwase et al. | 277/628 |
| 2012/0313331 A1 | * | 12/2012 | Yamamoto | 277/650 |

FOREIGN PATENT DOCUMENTS

| | | |
|---|---|---|
| CN | 1831388 A | 9/2006 |
| EP | 1 235 008 A2 | 8/2002 |
| JP | 2002-181193 | 6/2002 |
| JP | 2004-68672 | 3/2004 |
| JP | 2005-146933 | 6/2005 |
| JP | 2005-188375 | 7/2005 |
| JP | 2010-31790 | 2/2010 |
| JP | 2010-138702 | 6/2010 |

OTHER PUBLICATIONS

Chinese Office Action issued Sep. 29, 2012, in China Patent Application No. 201110023940.9 (with English translation).
Extended Search Report issued Jun. 8, 2011 in Europe Application No. 11151438.6.

* cited by examiner

*Primary Examiner* — Vishal Patel
*Assistant Examiner* — Nicholas L Foster
(74) *Attorney, Agent, or Firm* — Oblon, Spivak, McClelland, Maier & Neustadt, L.L.P.

(57) ABSTRACT

A seal structure for an engine includes a cylinder block, a cylinder head assembled via a first seal member on the cylinder block, a chain cover assembled via a second seal member on the cylinder block and the cylinder head that are assembled on each other, and a holding recess portion formed at an outer surface of a joint portion among the cylinder block, the cylinder head, and the chain cover, the holding recess portion retaining a liquid gasket and being filled therewith.

7 Claims, 3 Drawing Sheets

SEAL STRUCTURE FOR ENGINE

CROSS REFERENCE TO RELATED APPLICATIONS

This application is based on and claims priority under 35 U.S.C. §119 to Japanese Patent Application 2010-035155, filed on Feb. 19, 2010, the entire content of which is incorporated herein by reference.

TECHNICAL FIELD

This disclosure relates to a seal structure for an engine.

BACKGROUND DISCUSSION

A known method for assembling a cylinder block, a cylinder head, and a chain cover of an engine will be explained below.

The cylinder head is assembled on the cylinder block while a solid gasket (a plate-shaped gasket) serving as a first seal member is disposed or sandwiched between an upper joint surface of the cylinder block and a lower joint surface of the cylinder head. As a result, a clearance between the cylinder block and the cylinder head is closed.

Then, a liquid gasket (a liquid sealing agent) serving as a second seal member is applied to a lateral joint surface of the chain cover to thereby assemble the chain cover on the cylinder block and the cylinder head that are assembled on each other.

At this time, the liquid gasket applied to the lateral joint surface of the chain cover makes contact with a lateral joint surface of the cylinder block and a lateral joint surface of the cylinder head so as to close a clearance among the chain cover, the cylinder block, and the cylinder head. Accordingly, the cylinder block, the cylinder head, and the chain cover are assembled on each other while a sealing ability is secured.

At a time of an engine operation, however, wall portions of the cylinder block and the cylinder head are exposed to a combustion gas having a high temperature. Specifically, the cylinder head tends to be more heated than the cylinder block and thus tends to expand due to heat (i.e., a thermal expansion). Therefore, a relative displacement between the cylinder head and the cylinder block in a longitudinal direction of the engine may be generated, which leads to a clearance between the lateral joint surface of the chain cover and the lateral joint surface of the cylinder block at a joint portion among the cylinder block, the cylinder head, and the chain cover. At this time, the liquid gasket filled in the clearance among the cylinder block, the cylinder head, and the chain cover is affected by an excessive tensile deformation, which may lead to a deterioration of the sealing ability of the liquid gasket.

Further, at the time of the engine operation, depending on a material of the cylinder head or the cylinder block, a shape of the solid gasket, and the like, the degree of the thermal expansion of the cylinder head and that of the cylinder block may vary. Therefore, an end surface of the chain cover facing the lateral joint surface of the cylinder head and/or the lateral joint surface of the cylinder block is positioned away therefrom. Then, a clearance may be formed between the lower joint surface of the cylinder head and the upper joint surface of the cylinder block at the joint portion among the cylinder block, the cylinder head, and the chain cover. At this time, the liquid gasket with which the clearance is filled is affected by the excessive tensile deformation, which may lead to the deterioration of the sealing ability of the liquid gasket.

In order to solve the aforementioned issue, JP2005-188375A discloses a seal structure for an engine including a cut portion serving as a holding recess portion at which the liquid gasket is retained so that the cut portion is filled therewith. The cut portion is formed at a corner on an outer surface of the cylinder block at the joint portion among the cylinder block, the cylinder head, and the chain cover.

According to the seal structure disclosed in JP2005-188375A, the cylinder head is assembled on the cylinder block while the solid gasket is disposed or sandwiched between the upper joint surface of the cylinder bock and the lower joint surface of the cylinder head. Then, the liquid gasket, of which an amount is slightly greater than a required amount for closing the clearance among the cylinder block, the cylinder head, and the chain cover, is applied to the lateral joint surface of the chain cover. The chain cover is then assembled on the cylinder block and the cylinder head, which are assembled on each other.

At this time, the liquid gasket applied to the lateral joint surface of the chain cover makes contact with the lateral joint surface of the cylinder block and the lateral joint surface of the cylinder head to thereby close the clearance among the cylinder block, the cylinder head, and the chain cover. At the same time, the excess liquid gasket from the clearance among the cylinder block, the cylinder head, and the chain cover is pushed to the cut portion formed at the cylinder block.

When the engine is in operation, even in a case where the clearance is generated between the lateral joint surface of the chain cover and the lateral joint surface of the cylinder block or between the lower joint surface of the cylinder head and the upper joint surface of the cylinder block, the liquid gasket, with which the cut portion is filled, flows to be filled in such clearance. Therefore, the sealing ability of the liquid gasket is maintained.

However, the assembly of the chain cover on the cylinder bock and the cylinder head that are assembled on each other after the application of the liquid gasket only to the lateral joint surface of the chain cover may not achieve a secure filling of the liquid gasket at the cut portion.

In addition, because the cut portion is formed at the outer surface of the cylinder block, it may be difficult to determine whether the cut portion is practically sufficiently filled with the liquid gasket.

A need thus exists for a seal structure for an engine which is not susceptible to the drawback mentioned above.

SUMMARY

According to an aspect of this disclosure, a seal structure for an engine includes a cylinder block, a cylinder head assembled via a first seal member on the cylinder block, a chain cover assembled via a second seal member on the cylinder block and the cylinder head that are assembled on each other, and a holding recess portion formed at an outer surface of a joint portion among the cylinder block, the cylinder head, and the chain cover, the holding recess portion retaining a liquid gasket and being filled therewith.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

[First Embodiment]

A seal structure for an engine according to a first embodiment will be explained with reference to the attached drawings.

Figure 1:
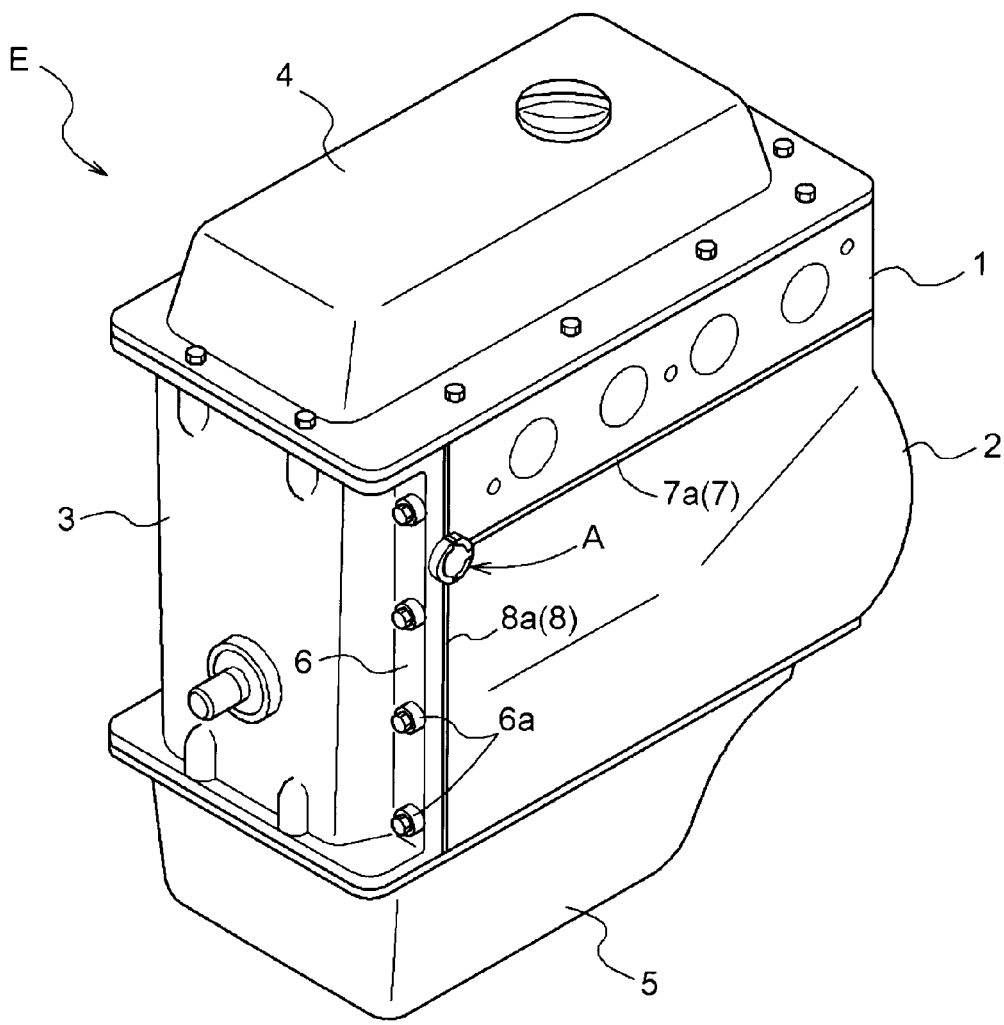
FIG. 1 is a perspective view illustrating a main portion of an engine according to a first embodiment disclosed here.

As illustrated in FIG. 1, an engine (an internal combustion engine) E includes a cylinder head 1, a cylinder block 2, and a chain cover 3. A cylinder head cover 4 is mounted at an upper side of the cylinder head 1 and the chain cover 3. An oil pan 5 is mounted at a lower side of the cylinder block 2 and the chain cover 3.

Figure 2:
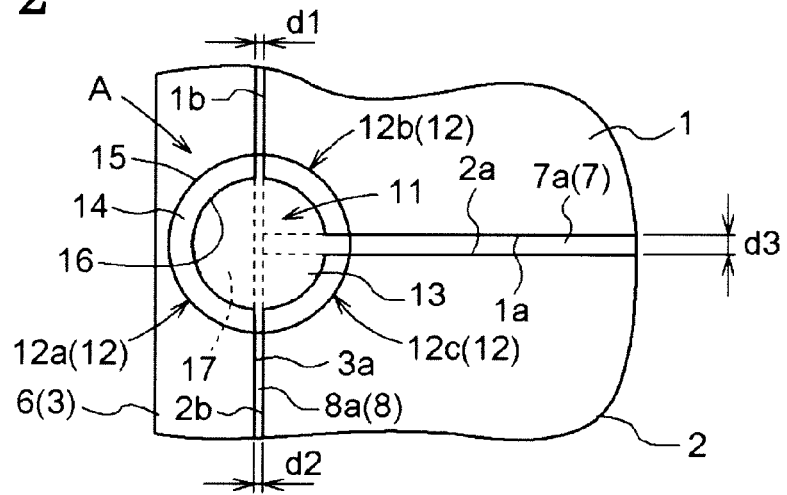
FIG. 2 is a side view of a bank portion in which a liquid gasket is filled according to the first embodiment.

The chain cover 3 includes a connection flange 6 having a predetermined thickness so as to be connected to the cylinder head 1 and the cylinder block 2. Fitting bolt seats 6a are formed at the connection flange 6. As illustrated in FIG. 2, the cylinder head 1 includes a lateral joint surface 1b, facing the chain cover 3, where a bolt hole facing one of the fitting bolt seats 6a is formed. In addition, the cylinder block 2 includes a lateral joint surface 2b, facing the chain cover 3, where a bolt hole facing another of the fitting bolt seats 6a is formed.

Each of the cylinder head 1, the cylinder block 2, and the chain cover 3 is formed by a metallic die-casting product. The cylinder head 1 and the chain cover 3 may be made of aluminum alloy having a light weight and a high heat conductivity. The cylinder block 2 may be made of casting iron having a high strength and a high abrasion resistance. At this time, however, the casting iron has a heavy weight and a low heat conductivity. Thus, in order to achieve the light weight and improve the heat conductivity while maintaining the strength and the abrasion resistance, a cylinder portion of the cylinder block 2 may be constituted by a sleeve made of casting iron while the other portion of the cylinder block 2 may be made of aluminum alloy. Alternatively, the cylinder block 2 may be made of aluminum alloy and a plating process or a plasma coating may be conducted on the cylinder portion of the cylinder block 2.

As illustrated in FIGS. 1 to 3, the seal structure for the engine according to the present embodiment includes a first joint portion 7 where the cylinder head 1 is connected to an upper portion of the cylinder block 2 via a solid gasket 7a serving as an example of a first seal member, and a second joint portion 8 where the chain cover 3 is connected to respective side portions of the cylinder block 2 and the cylinder head 1 via a liquid gasket 8a such as an FIPG (Formed In Place Gasket) serving as an example of a second seal member.

At the first joint portion 7, the cylinder head 1 is connected to the cylinder block 2 by means of a bolt while the solid gasket 7a is sandwiched between a lower joint surface 1a having a flat shape and formed at the cylinder head 1 and an upper joint surface 2a having a flat shape and formed at the cylinder block 2.

At the second joint portion 8, the cylinder head 1 and the cylinder block 2 are connected to the chain cover 3 by means of bolts inserted into the respective fitting bolt seats 6a formed at the connection flange 6 while the liquid gasket 8a is sandwiched among a lateral joint surface 3a having a flat shape and formed at the connection flange 6 of the chain cover 3, the lateral joint surface 1b having a flat shape and formed at the cylinder head 1, and the lateral joint surface 2b having a flat shape and formed at the cylinder block 2.

When the engine E is in operation (i.e., the engine operation), wall portions of the cylinder head 1, and the like are exposed to a combustion gas having a high temperature. Specifically, the cylinder head 1 tends to be heated more than the cylinder block 2 and tends to expand due to heat. Thus, a relative displacement may occur between the cylinder head 1 and the cylinder block 2 in a longitudinal direction of the engine E, which may lead to a clearance between the lateral joint surface 3a of the chain cover 3 and the lateral joint surface 2b of the cylinder block 2 at a joint portion 11 where the cylinder block 2, the cylinder head 1, and the chain cover 3 face one another. At this time, the liquid gasket 8a filled in the clearance is affected by an excessive tensile deformation, thereby deteriorating a sealing ability of the liquid gasket 8a.

The joint portion 11 among the cylinder block 2, the cylinder head 1, and the chain cover 3 is formed at a portion where the first joint portion 7 and the second joint portion 8 face each other. As illustrated in FIGS. 1 to 3, an annular-shaped bank portion 12 is formed at outer surfaces of the cylinder block 2, the cylinder head 1, and the chain cover 3 while projecting in a direction substantially perpendicular thereto so as to obtain a holding recess portion A where a liquid gasket 13 is filled and retained. The bank portion 12 surrounds the joint portion 11 so as to form into a circular shape in a plan view as illustrated in FIG. 2 about substantially a center of the joint portion 11.

Figure 3A:
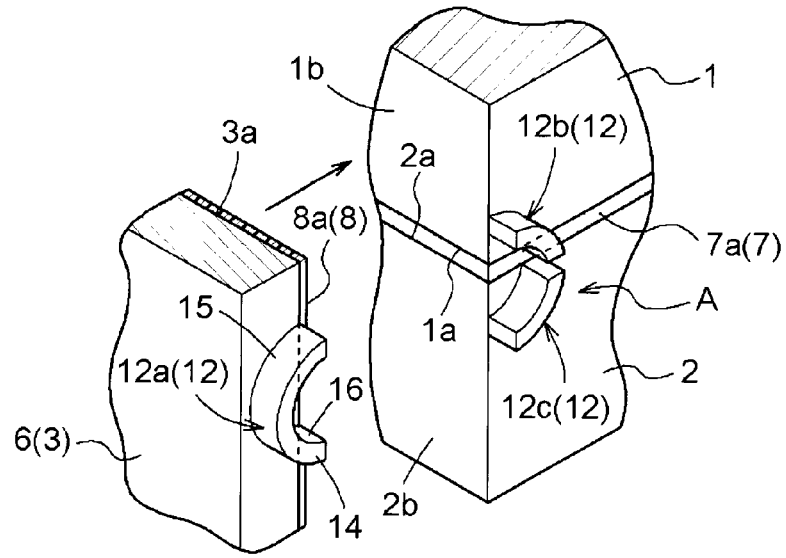
FIGS. 3A, 3B, and 3C are perspective views illustrating a process for assembling the engine according to the first embodiment.

Specifically, as illustrated in FIG. 3A, the bank portion 12 includes a left bank piece 12a having a semicircular shape and serving as a semicircular bank piece, an upper-right bank piece 12b having a quarter-circular shape and serving as a quarter-circular bank piece, and a lower-right bank piece 12c having a quarter-circular shape and serving as the quarter-circular bank piece. The left bank piece 12a is formed at the outer surface of the chain cover 3. The upper-right bank piece 12b is formed at a corner on the outer surface of the cylinder head 1. The lower-right bank piece 12c is formed at a corner on the outer surface of the cylinder block 2.

Each of the lateral joint surface 3a of the chain cover 3, the lower joint surface 1a and the lateral joint surface 1b of the cylinder head 1, the upper joint surface 2a and the lateral joint surface 2b of the cylinder block 2 is formed to have a flat shape, i.e., formed on an identical flat plane. Accordingly, as illustrated in FIG. 2, a clearance d1, which is defined between the lateral joint surface 3a of the chain cover 3 and the lateral joint surface 1b of the cylinder head 1, is also formed between the left bank piece 12a and the upper-right bank piece 12b. In addition, a clearance d2, which is defined between the lateral joint surface 3a of the chain cover 3 and the lateral joint surface 2b of the cylinder block 2, is also formed between the left bank piece 12a and the lower-right bank piece 12c. Further, a clearance d3, which is defined between the lower joint surface 1a of the cylinder head 1 and the upper joint surface 2a of the cylinder bock 2, is also formed between the upper-right bank piece 12b and the lower-right bank piece 12c.

As mentioned above, a possible clearance may be formed between each of the adjacent left, upper-right, and lower-right bank pieces 12a, 12b, and 12c. However, such clearance is extremely small and therefore the adjacent left, upper-right, and lower-right bank pieces 12a, 12b, and 12c are practically continuously formed in a circumferential direction thereof.

Figure 3B:
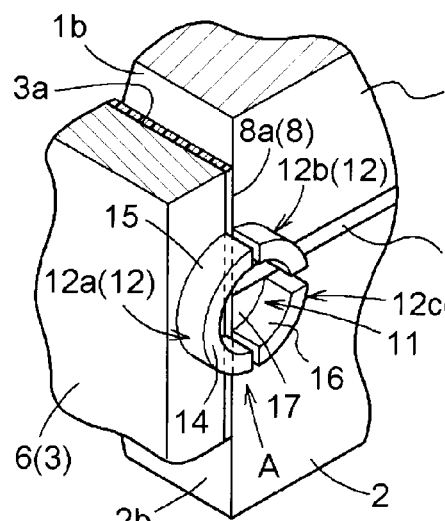
Figure 3C:
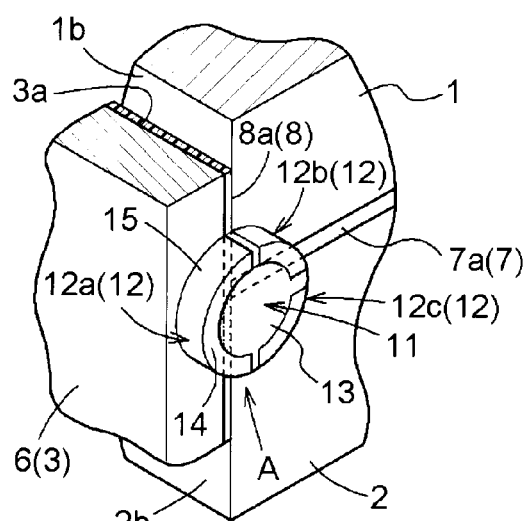
Figure 3D:
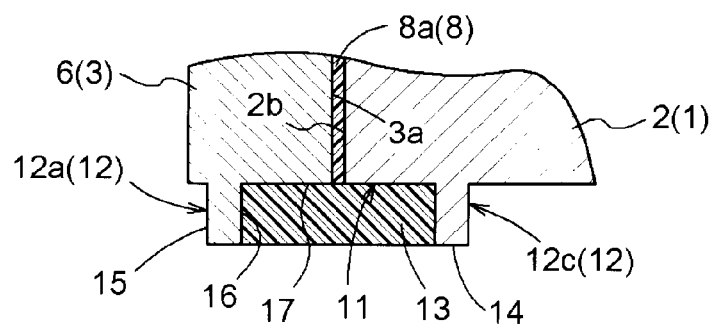
FIG. 3D is a sectional view further illustrating the process for assembling the engine according to FIGS. 3A, 3B, and 3C.

As illustrated in FIGS. 3A, 3B, and 3C, the bank portion 12 includes a ring-shaped top surface 14, a cylindrical-shaped outer peripheral surface 15, and a cylindrical-shaped inner peripheral surface 16. The top surface 14 of the bank portion 12 is formed to have a flat shape, i.e., formed on an identical flat plane and is positioned as a whole, for example, in parallel to the outer surfaces of the cylinder block 2, the cylinder head 1, and the chain cover 3 in a vertical direction in FIGS. 3A, 3B and 3C. Thus, the bank portion 12 is restrained from interfering with external components while being prevented from extremely protruding from the outer surfaces of the cylinder block 2, the cylinder head 1, and the chain cover 3. That is, a surface of the liquid gasket 13 filled in the bank portion 12 (the holding recess portion A) is coplanar with the top surface 14 of the bank portion 12. A circular-shaped application surface 17 is formed at an inner side of the bank portion 12 as illustrated in FIG. 3B so that the liquid gasket 13 is applied to the application surface 17. The application surface 17 and the inner peripheral surface 16 of the bank portion 12 constitute surfaces forming the holding recess portion A (i.e., forming surfaces of the holding recess portion A).

As illustrated in FIG. 3A, the cylinder block 2 and the cylinder head 1 are connected to each other by means of a bolt while the solid gasket 7a is sandwiched between the upper joint surface 2a of the cylinder block 2 and the lower joint surface 1a of the cylinder head 1.

The liquid gasket 8a is applied to the lateral joint surface 3a of the chain cover 3 and then the cylinder block 2 and the cylinder head 1 are connected to the chain cover 3 by means of a bolt as illustrated in FIG. 3B.

At this time, the liquid gasket 8a applied to the lateral joint surface 3a of the chain cover 3 makes contact with the lateral joint surface 2b of the cylinder block 2 and the lateral joint surface 1b of the cylinder head 1.

In the aforementioned case, however, a possible clearance may be formed between the chain cover 3 and the cylinder block 2, between the cylinder head 1 and the cylinder block 2, or the like at the joint portion 11 because of a machining accuracy, an assembling accuracy, or the like. Then, the sufficient filing of the liquid gasket 8a may not be achieved.

Therefore, after the cylinder block 2, the cylinder head 1, and the chain cover 3 are assembled on one another, an inner portion of the bank portion 12 is filled with the liquid gasket 13. Then, a scraper, or the like is applied to slide on the top surface 14 in the vertical direction in FIGS. 3C and 3D. Accordingly, the liquid gasket 13 is filled in the clearance formed at the joint portion 11 so that the clearance is filled with the liquid gasket 13. Afterwards, the liquid gasket 13 filled within the inner portion of the bank portion 12 becomes solidified so that a button-shaped seal member is formed to surround the joint portion 11. As a result, even when the sealing ability of the joint portion 11 is deteriorated at the time of the engine operation, the button-shaped seal member that completely seals the surrounding of the joint portion 11 maintains the sealing effect of the joint portion 11.

Figure 4A:
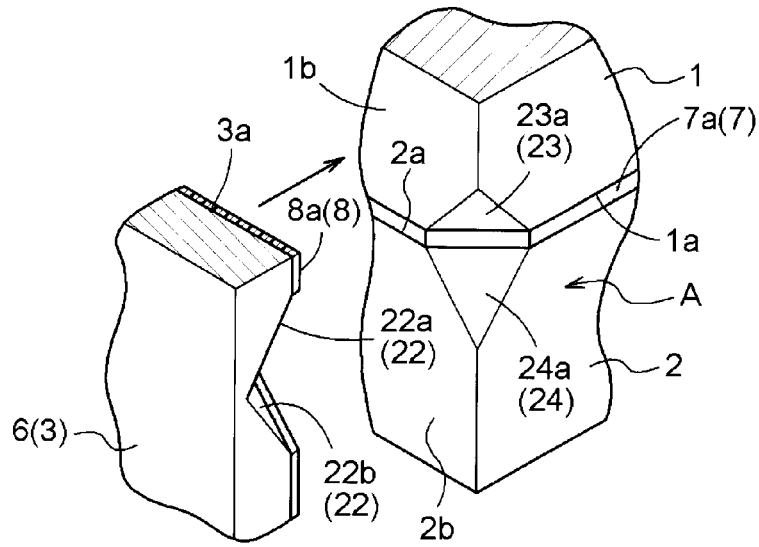
FIGS. 4A, 4B and 4C are perspective views illustrating a process for assembling the engine according to a second embodiment.
Figure 4B:
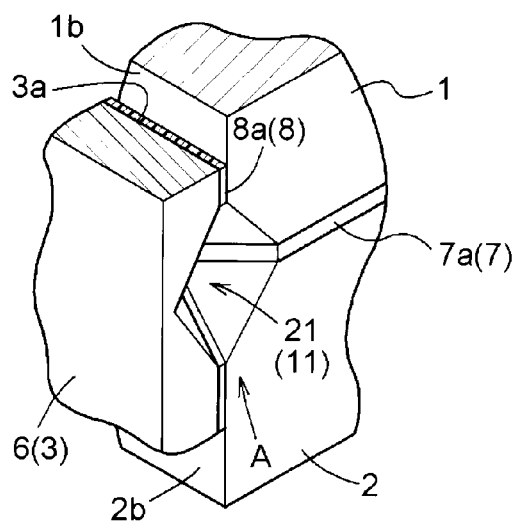
Figure 4C:
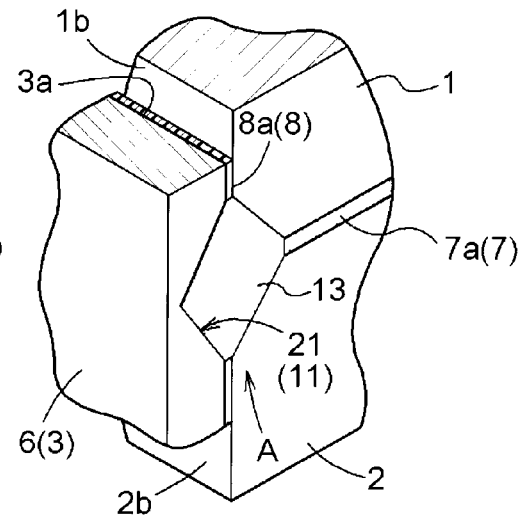

[Second Embodiment]
A second embodiment will be explained with reference to FIGS. 4A, 4B, and 4C illustrating the holding recess portion having the different structure from that of the first embodiment. Only a difference of the second embodiment from the first embodiment will be described and an explanation of the same structure as the first embodiment will be omitted.

A cut portion 21 having a four-sided pyramid shape and surrounding the joint portion 11 is formed over the outer surfaces of the cylinder head 1, the cylinder block 2, and the chain cover 3 so as to obtain the holding recess portion A where the liquid gasket 13 is filled and retained.

Specifically, a cutting portion 22 having a V-shape in a cross section that includes two inclination surfaces 22a and 22b each having a triangular shape is formed at the outer surface of the chain cover 3. In addition, an upper-right chamfer portion 23 serving as a chamfer portion and including an inclination surface 23a that has a triangular shape is formed at the corner on the outer surface of the cylinder head 1. Further, a lower-right chamfer portion 24 serving as the chamfer portion and including an inclination surface 24a that has a triangular shape is formed at the corner on the outer surface of the cylinder block 2. The inclination surfaces 22a, 22b, 23a, and 24a constitute side surfaces of the cut portion 21 formed into the four-sided pyramid shape. The inclination surfaces 22a, 22b, 23a and 24a also constitute application surfaces where the liquid gasket 13 is applied and surfaces forming the holding recess portion A (i.e., forming surfaces of the holding recess portion A). The cutting portion 22 and the chamfer portions 23 and 24 are continuously formed in a circumferential direction. A clearance may be defined between the adjacent cutting portion 22 and the chamfer portions 23 and 24. However, such clearance is extremely small.

As illustrated in FIG. 4A, the cylinder block 2 and the cylinder head 1 are connected and jointed to each other by means of a bolt while the solid gasket 7a is sandwiched between the upper joint surface 2a of the cylinder block 2 and the lower joint surface 1a of the cylinder head 1.

As illustrated in FIG. 4B, the cylinder block 2 and the cylinder head 1 are connected and jointed to the chain cover 3 by means of a bolt while the liquid gasket 8a is applied to the lateral joint surface 3a of the chain cover 3. At this time, the liquid gasket 8a applied to the lateral joint surface 3a of the chain cover 3 makes contact with the lateral joint surface 2b of the cylinder block 2 and the lateral joint surface 1b of the cylinder head 1.

Figure 4D:
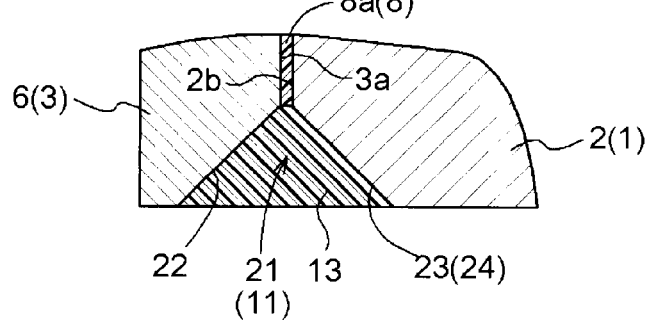
FIG. 4D is a sectional view further illustrating the process for assembling the engine according to FIGS. 4A, 4B, and 4C.

After the cylinder block 2, the cylinder head 1, and the chain cover 3 are assembled on one another, an inner portion of the cut portion 21 is filled with the liquid gasket 13 as illustrated in FIGS. 4C and 4D.

According to the aforementioned first and second embodiments, the first seal member corresponds to the solid gasket 7a and the second seal member corresponds to the liquid gasket 8a. Alternatively, the first seal member may correspond to the liquid gasket and the second seal member may correspond to the solid gasket. Alternatively, the first and second seal members may both correspond to the liquid gasket or the solid gasket. Further, various types of liquid seal material may serve as the liquid seal member.

The adjacent left, upper-right, and lower-right bank pieces 12a, 12b, and 12c may have large clearances thereamong so that the left, upper-right, and lower-right bank pieces 12a, 12b, and 12c are discontinuously formed in a circumferential direction thereof. Accordingly, the adjacent left, upper-right, and lower-right bank pieces 12a, 12b, and 12c are prevented from interfering with one another. At this time, the application surface 17 of the bank portion 12 and respective inner surfaces of the left, upper-right and lower-right bank pieces 12a, 12b, and 12c constitute the forming surfaces of the holding recess portion A.

According to the first embodiment, the bank portion 12 having the annular shape is formed, in a projecting manner, over the outer surfaces of the cylinder block 2, the cylinder head 1, and the chain cover 3. At this time, the shape of the bank portion 12 is not limited to the annular shape and may be a polygon shape, or the like.

According to the second embodiment, the cut portion 21 having the four-sided pyramid shape is formed over the outer surfaces of the cylinder block 2, the cylinder head 1, and the chain cover 3. At this time, the shape of the cut portion 21 is not limited to the four-sided pyramid shape and may be a polygonal pyramid shape, a circular cone shape, a hemispherical shape, or the like.

According to the first embodiment, the top surface 14 of the bank portion 12 is formed to have the flat shape, i.e., formed on the identical flat plane and is positioned in parallel to the outer surfaces of the cylinder block 2, the cylinder head 1, and the chain cover 3 in the vertical direction in FIGS. 3A, 3B and 3C. Alternatively, the top surface 14 may have a flat shape that inclines relative to the vertical direction so that the bank portion 12 protrudes greater from the outer surfaces of the cylinder block 2, the cylinder head 1, and the chain cover 3 in the downward direction.

The first and second embodiments are applicable to the seal structure for various types of engines including the cylinder block, the cylinder head assembled thereon via the first seal member, and the chain cover assembled via the second seal member on the cylinder block and the cylinder head that are assembled on each other.

According to the aforementioned first and second embodiments, the cylinder block 2 is assembled on the cylinder head 1 via the solid gasket 7a (the first seal member) and thereafter the chain cover 3 is assembled on the cylinder block 2 and the cylinder head 1, which are assembled on each other, via the liquid gasket 8a (the second seal member). After the cylinder block 2, the cylinder head 1, and the chain cover 3 are assembled, the liquid gasket 13 is filled within the holding recess portion A. Accordingly, the liquid gasket 13 is securely applied to the joint portion 11 so that the joint portion 11 is sufficiently filled with the liquid gasket 13.

In addition, at a time when the liquid gasket 13 is applied to the holding recess portion A, the liquid gasket 13 is appropriately retained at the holding recess portion A and is prevented from leaking from the holding recess portion A. Further, because an application range of the liquid gasket 13 is easily observed, the application operation may be simply conducted and a completion of the application of the liquid gasket 13 at the holding recess portion A is confirmable. As necessary, the liquid gasket 13 may be again applied to the holding recess portion A.

According to the aforementioned first and second embodiments, the surfaces forming the holding recess portion A are continuously formed while surrounding the joint portion 11.

Accordingly, even in a case where the sealing ability between the chain cover 3 and the cylinder block 2, between the cylinder head 1 and the cylinder block 2, or the like at the joint portion 11 is deteriorated when the engine is in operation, the complete sealing of the liquid gasket 13, filled within the holding recess portion A, at the surrounding of the joint portion 11 improves the sealing effectiveness at the joint portion 11.

In addition, according to the aforementioned first and second embodiments, the liquid gasket 13 that is filled in the holding recess portion A is filled in the clearance d3 formed between the cylinder block 2 and the cylinder head 1, the clearance d2 formed between the cylinder block 2 and the chain cover 3, and the clearance d1 formed between the cylinder head 1 and the chain cover 3.

Accordingly, the liquid gasket 13 is securely applied to the joint portion 11 among the cylinder block 2, the cylinder head 1, and the chain cover 3 so that the joint portion 11 is sufficiently filled with the liquid gasket 13.

Further, according to the aforementioned first embodiment, the holding recess portion A is constituted by the bank portion 12 that protrudes from the outer surfaces of the cylinder block 2, the cylinder head 1, and the chain cover 3 and that surrounds the joint portion 11.

Accordingly, because the holding recess portion A is obtained by the bank portion 12 that protrudes from the outer surfaces of the cylinder block 2, the cylinder head 1, and the chain cover 3, a seal portion achieved by the liquid gasket 13 is formed at the respective outer surfaces of the cylinder block 2, the cylinder head 1, and the chain cover 3 while facing areas of projecting portions formed at the cylinder block 2, the cylinder head 1, and the chain cover 3 are secured.

According to the aforementioned first embodiment, the bank portion 12 is continuously formed.

Accordingly, even when the liquid gasket 13 is pushed to be filled in the clearance at the joint portion 11 by a scraper, or the like, for example, the liquid gasket 13 is prevented from leaking to an outside of the bank portion 12. As a result, the liquid gasket 13 is tightly filled within the bank portion 12, thereby further enhancing the sealing ability of the joint portion 11.

At this time, a state where the bank portion 12 is continuously formed includes not only a case where the left bank piece 12a, the upper-right bank piece 12b, and the lower-right bank piece 12c are completely in contact to one another but also a case where the left bank piece 12a, the upper-right bank piece 12b, and the lower-right bank piece 12c are closely arranged while having respective clearances thereamong through which the liquid gasket 13 does not leak.

According to the aforementioned first embodiment, the top surface 14 of the bank portion 12 is formed on the identical flat plane.

Because the top surface 14 is formed on the identical flat plane, the liquid gasket 13 is easily pushed to the clearance at the joint portion 11 by positioning a scraper, or the like at the top surface 14 of the bank portion 12 to slide thereon to thereby level the liquid gasket 13 to the height of the top surface 14 of the bank portion 12. Further, the bank portion 12 includes not only a function to retain the liquid gasket 13 but also a guiding function to apply the liquid gasket 13, to take off the excess liquid gasket 13, and the like so that a predetermined amount of the liquid gasket 13 is filled within the bank portion 12. Furthermore, the solid gasket 7a (the first seal member) may not be damaged when the liquid gasket 13 is applied or taken off relative to the bank portion 12.

According to the aforementioned first embodiment, the bank portion 12 includes the left bank piece 12a and the upper-right and lower-right bank pieces 12b and 12c, the left bank piece 12a being formed at the chain cover 3, the upper-right and lower-right bank pieces 12b and 12c being formed at the cylinder block 2 and the cylinder head 1 respectively, the left bank piece 12a and the upper-right and lower-right bank pieces 12b and 12c surrounding the joint portion 11.

Accordingly, a seal portion achieved by the liquid gasket 13 is formed at the respective outer surfaces of the cylinder block 2, the cylinder head 1, and the chain cover 3 while facing areas of the left bank piece 12a, and the upper-right and lower-right bank pieces 12b, 12c formed at the chain cover 3, the cylinder head 1, and the cylinder block 2 respectively are secured. In addition, the holding recess portion A is achieved by a simple structure.

According to the aforementioned second embodiment, the seal structure for the engine further includes the cutting portion 22 formed at the chain cover 3 and having a V-shape in a cross section, and the chamfer portions 23 and 24 formed at the cylinder block 2 and the cylinder head 1 respectively and each having a triangular shape, the cutting portion 22 and the chamfer portions 23 and 24 constituting the holding recess portion A.

Accordingly, a seal portion achieved by the liquid gasket 13 is formed at the respective outer surfaces of the cylinder block 2, the cylinder head 1, and the chain cover 3 while facing areas of the cutting portion 22, and the chamfer portions 23 and 24 formed at the chain cover 3, the cylinder head 1, and the cylinder block 2 respectively are secured. In addition, the holding recess portion A is achieved by a simple structure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seal structure for an engine, comprising:
a cylinder block;
a cylinder head assembled via a first seal member on the cylinder block;
a chain cover assembled via a second seal member on the cylinder block and the cylinder head that are assembled on each other; and
a holding recess portion formed at an outer surface of a joint portion among the cylinder block, the cylinder head, and the chain cover wherein
the holding recess portion is constituted by a bank portion that protrudes beyond respective outer surfaces of each of the cylinder block, the cylinder head, and the chain cover, the respective outer surfaces being part of an exterior of the engine, and the bank portion surrounds the joint portion, and
the bank portion is open to the exterior of the engine and is configured to be filled with and retain a liquid gasket when the cylinder block, the cylinder head, and the chain cover are assembled together.

2. The seal structure according to claim 1, wherein surfaces forming the holding recess portion surround the joint portion.

3. The seal structure according to claim 1, wherein the liquid gasket filled in the holding recess portion is filled in a clearance formed between the cylinder block and the cylinder head, a clearance formed between the cylinder block and the chain cover, and a clearance formed between the cylinder head and the chain cover.

4. The seal structure according to claim 2, wherein the liquid gasket filled in the holding recess portion is filled in a clearance formed between the cylinder block and the cylinder head, a clearance formed between the cylinder block and the chain cover, and a clearance formed between the cylinder head and the chain cover.

5. The seal structure according to claim 1, wherein
the bank portion comprises at least one piece that protrudes from each of the respective outer surfaces of the cylinder block, the cylinder head, and the chain cover, and
a top surface of the bank portion is on a flat plane.

6. The seal structure according to claim 1, wherein the bank portion includes a semicircular bank piece and two quarter-circular bank pieces, the semicircular bank piece being formed at the chain cover, the two quarter-circular bank pieces being formed at the cylinder block and the cylinder head respectively, the semicircular bank piece and the two quarter-circular bank pieces surrounding the joint portion.

7. A seal structure for an engine, comprising:
a cylinder block;
a cylinder head assembled via a first seal member on the cylinder block;
a chain cover assembled via a second seal member on the cylinder block and the cylinder head that are assembled on each other;
a holding recess portion formed at an outer surface of a joint portion among the cylinder block, the cylinder head, and the chain cover, the holding recess portion retaining a liquid gasket and being filled therewith; and
a cutting portion formed at the chain cover and having a V-shape in a cross section and chamfer portions formed at the cylinder block and the cylinder head respectively and each having a triangular shape, the cutting portion and the chamfer portions constituting the holding recess portion.

* * * * *